(12) United States Patent
Bessone et al.

(10) Patent No.: US 12,427,468 B2
(45) Date of Patent: Sep. 30, 2025

(54) AIR FILTER ELEMENT AND AIR FILTER COMPRISING SAME

(71) Applicant: Donaldson Company, Inc., Bloomington, MN (US)

(72) Inventors: Sébastien Bessone, Asnières-sur-seine (FR); Jean-Philippe Da Cunha, Sartrouville (FR)

(73) Assignee: Donaldson Company, Inc., Bloomington, MN (US)

( * ) Notice: Subject to any disclaimer, the term of this patent is extended or adjusted under 35 U.S.C. 154(b) by 586 days.

(21) Appl. No.: 17/783,908

(22) PCT Filed: Dec. 9, 2020

(86) PCT No.: PCT/US2020/063894
§ 371 (c)(1),
(2) Date: Jun. 9, 2022

(87) PCT Pub. No.: WO2021/119059
PCT Pub. Date: Jun. 17, 2021

(65) Prior Publication Data
US 2023/0050612 A1 Feb. 16, 2023

(30) Foreign Application Priority Data

Dec. 10, 2019 (EP) .................................... 19215057

(51) Int. Cl.
*B01D 53/22* (2006.01)
*B01D 46/24* (2006.01)
*B01D 46/60* (2022.01)

(52) U.S. Cl.
CPC ......... *B01D 46/60* (2022.01); *B01D 46/2414* (2013.01); *B01D 2265/028* (2013.01); *B01D 2271/022* (2013.01); *B01D 2275/206* (2013.01)

(58) Field of Classification Search
CPC ................ B01D 46/60; B01D 46/2414; B01D 2265/028; B01D 2271/022; B01D 2275/206
See application file for complete search history.

(56) References Cited

U.S. PATENT DOCUMENTS

| | | | | |
|---|---|---|---|---|
| 5,824,126 | A | * 10/1998 | Chen | ...................... B01D 46/10 55/504 |
| 2002/0139251 | A1 | * 10/2002 | Simmons | ................. B60H 1/34 55/385.3 |

(Continued)

FOREIGN PATENT DOCUMENTS

| | | |
|---|---|---|
| EP | 0 487 831 | 6/1992 |
| EP | 2 644 246 | 10/2013 |
| WO | 2012/156789 | 11/2012 |

OTHER PUBLICATIONS

International Patent Application No. PCT/US2020/063894, filed Dec. 9, 2020; International Preliminary Report on Patentability, issued May 17, 2022, 7 pages.

(Continued)

*Primary Examiner* — Anthony R Shumate
(74) *Attorney, Agent, or Firm* — Mueting Raasch Group (57) ABSTRACT

The invention pertains to an air filter element comprising a tubular main body having a first axial end surface and a second axial end surface; wherein said first end surface comprises a first engagement means and said second end surface comprises a second engagement means; said first engagement means and said second engagement means being configured to enter into releasable engagement such that said first engagement means releasably engages with a second engagement means of a like air filter element in axial alignment with said air filter element and said second engagement means releasably engages with a first engagement means of a like air filter element in axial alignment (Continued)

with said air filter element; whereby said releasable engagement is able to withstand an axial pulling force up to a first level and whereby said releasable engagement is released when subjected to a pulling force above a second level.

18 Claims, 6 Drawing Sheets

(56) References Cited

U.S. PATENT DOCUMENTS

| | | | |
|---|---|---|---|
| 2003/0000755 A1* | 1/2003 | Schroeder | B62K 11/04 180/229 |
| 2005/0279063 A1* | 12/2005 | Simmons | B01D 46/0005 55/495 |
| 2006/0162302 A1* | 7/2006 | Terrell | B25C 1/047 55/385.1 |
| 2008/0086995 A1* | 4/2008 | Westlund | B01D 46/2414 55/502 |
| 2010/0162672 A1* | 7/2010 | Kim | B01D 46/70 55/365 |
| 2013/0055693 A1 | 3/2013 | Clarke et al. | |
| 2014/0020561 A1 | 1/2014 | Aery | |
| 2015/0047637 A1* | 2/2015 | Peters | A62B 7/12 128/203.26 |
| 2015/0174435 A1* | 6/2015 | Jones | A62B 18/10 128/202.13 |
| 2015/0217218 A1 | 8/2015 | Caliendo et al. | |
| 2018/0099239 A1 | 4/2018 | Canfield | |

OTHER PUBLICATIONS

International Patent Application No. PCT/US2020/063894, filed Dec. 9, 2020; Report and Written Opinion mailed Feb. 12, 2021, 11 pages.

\* cited by examiner

AIR FILTER ELEMENT AND AIR FILTER COMPRISING SAME

CROSS REFERENCE TO RELATED APPLICATIONS

This application is the § 371 U.S. National Stage of International Application No. PCT/US2020/063894, filed 9 Dec. 2020, which claims the benefit of priority under 35 U.S.C. § 119 of EP Application Serial No. 19215057.1, filed 10 Dec. 2019, the disclosures of which are incorporated by reference herein in their entireties.

FIELD OF THE INVENTION

The present disclosure pertains to the field of air filters, in particular air filters composed of several axially aligned air filter elements.

BACKGROUND

It is a known problem that when large amounts of air need to be filtered, relatively large filtering surfaces are required, which tends to make the resulting filters large and awkward to manipulate during servicing. This is particularly inconvenient in situations where space is at a premium, such as aboard aircraft, where it is not feasible to provide a significant amount of extra empty space near the servicing opening of a filter housing just to facilitate the insertion and extraction of the filter elements.

European patent application publication no. EP 2644246 A1, in the name of Safran Filtration Systems, establishes in its "Background" section that it is known to address this problem by providing filters that are composed, along their longitudinal axis, of multiple detachable elements. Thus, filter elements, which are individually easy to manipulate in the available space envelope, are slid into a housing one by one and engage with each other to form a single assembled filter inside the housing. EP 2644246 A1 specifically discloses a filter having a longitudinal housing presenting an opening at one of its ends, and two filtering elements that are inserted in the housing via the opening. Each of the filtering elements includes an assembly unit e.g. metal section, adapted to engage at the time of abutment of the filtering elements to associate with the filtering elements in translation according to a longitudinal direction. The assembly units are adapted to disengage during a relative displacement of the filtering elements according to a direction approximately perpendicular to the longitudinal direction. It is a disadvantage of this system that it requires manipulation of the filter elements in different directions during extraction and disassembly.

In view of the above, it is an object of the present disclosure to provide an improved air filter element for use in an air filter.

SUMMARY OF THE INVENTION

According to an aspect of the present disclosure, there is provided an air filter element comprising a tubular main body having a first axial end surface and a second axial end surface; wherein said first end surface comprises a first engagement means and said second end surface comprises a second engagement means;

said first engagement means and said second engagement means being configured to enter into releasable engagement such that said first engagement means releasably engages with a second engagement means of a like air filter element in axial alignment with said air filter element and said second engagement means releasably engages with a first engagement means of a like air filter element in axial alignment with said filter element;

whereby said releasable engagement is able to withstand an axial pulling force up to a first level and whereby said releasable engagement is released when subjected to a pulling force above a second level.

The presently disclosed air filter element is based inter alia on the insight of the inventors that by judiciously engineering the strength of the axial coupling between different axially adjacent filter elements forming the filter, it is possible to obtain an assembly that does not lose engagement of its parts when it is being pulled out of its housing during servicing, but that can nevertheless easily be disassembled by hand by exerting a (slightly) greater axially oriented pulling force. It is an advantage of the presently disclosed air filter element that the filter can be easily disassembled upon extraction of the filter from the housing without using special tools and without the need to apply torsion, rotation, or awkward movements in different directions.

In an embodiment of the air filter element of the present disclosure, at least one of said first engagement means and said second engagement means comprises a fabric presenting a plurality of axially extending hooks and at least the other one of said first engagement means and said second engagement means comprises a fabric presenting a plurality of axially extending loops, said hooks and said loops being arranged to releasably engage with each other.

The use of hook-and-loop fasteners (also known as "Velcro") is a very convenient way to provide a secure releasable engagement that connects and disconnects in a purely axial direction. As hook-and-loop fasteners do not present any hard protruding elements, there is no risk of injuring the operator during servicing of the filter.

In an embodiment of the air filter element according to the present disclosure, each of the first engagement means and the second engagement means comprises a fabric designed to releasably engage with a like fabric.

Releasable engagement between like fabrics may be obtained by providing both axially extending hooks and axially extending loops on the same fabric, said hooks and said loops being arranged to releasably engage with each other. This is essentially a mixed-type hook-and-loop fastener.

Releasable engagement between like fabrics may be obtained by providing axially extending mushroom-shaped protrusions (stems) on the fabric, said protrusions being arranged to releasably engage with each other. This type of fabric is commercially available as "dual lock" fasteners (e.g., the "dual lock" range 53550 of 3M (Maplewood, Minnesota, USA)).

The use of self-engaging fabric makes both the manufacturing and the handling and use of the filter element more convenient, as the same type of fabric can be used on both sides of the filter element.

In an embodiment of the air filter element of the present disclosure, at least one of said fabrics is arranged on a convexly curved support.

It is an advantage of this embodiment that when two filter elements are brought together with a view to linking their engagement means to each other, only a relatively small portion of the fabric on the first filter element (in particular, the portion of the fabric that bulges or protrudes outwardly due to the curvature of the support) will initially contact its counterpart on the other filter element. This will facilitate the initial engagement (which takes place only in this relatively small area) and allows a gradually increase of the area of engagement as the filter elements are pushed further towards each other. Preferably, both engagement means are arranged on convexly curved supports.

In an embodiment of the air filter element of the present disclosure, at least one of said fabrics is arranged on a support that is movably affixed to the respective axial end surface.

The term "movably affixed" is used herein to denote the ability of the support to be moved over a small distance along the plane of the axial end surface that carries it. Movement may be allowed along one dimension. Alternatively, movement may be allowed along two dimensions. The allowed extent of the movement is preferably at least 0.2 mm, but may also be at least 0.4 mm, 0.6 mm, 0.8 mm, 1 mm, 2 mm, 3 mm, or even at least 4 mm, whereby it is understood that the minimal allowed extent of the movement is not necessarily identical in each direction (if movement is allowed along two dimensions). The allowed extent of the movement is preferably limited to at most 4 mm, but may also be at most 3 mm, 2 mm, 1 mm, 0.8 mm, 0.6 mm, 0.4 mm, or even at most 0.2 mm, whereby it is again understood that the maximal allowed extent of the movement is not necessarily identical in each direction (if movement is allowed along two dimensions). Accordingly, a preferred interval for the allowed extent of the movement is between 0.2 mm and 1 mm, more preferably between 0.4 mm and 0.8 mm, and most preferably around 0.6 mm, whereby it is again understood that the minimal allowed extent of the movement is not necessarily identical in each direction (if movement is allowed along two dimensions).

It is an advantage of this embodiment that the fabrics can be aligned during the engagement process so as to optimally position the hooks/loops, mushroom-shaped protrusions, or other engagement elements provided on the fabric relative to the elements provided on their counterpart, to promote their mutual engagement.

In an embodiment of the air filter element of the present disclosure, the fabrics carry engagement elements arranged in wave-shaped rows.

It is an advantage of this embodiment that the fabrics are easier to disengage.

In an embodiment of the air filter element of the present disclosure, at least one of said first engagement means and said second engagement means comprises a number of axial protrusions, each having a bulging portion at its axial end, and at least the other one of said first engagement means and said second engagement means comprises said same number of receptors, arranged to elastically clamp the bulging portions of the axial protrusions of a like air filter element in axial alignment with said air filter element.

The use of snap fasteners is a very convenient way to provide a secure releasable engagement that connects and disconnects in a purely axial direction.

In an embodiment of the air filter element of the present disclosure, said first engagement means comprises a magnet having a first polarity, and wherein said second engagement means comprises a second polarity, different from said first polarity.

In an embodiment of the air filter element of the present disclosure, one of said first and second axial end surfaces comprises an axial seal and the other one of said first and second axial end surfaces comprises a complementary sealing surface, arranged in such a way that inner cavities of said air filter element and a like air filter element in axial alignment with said air filter element can be sealingly joined to form a single cavity.

The complementary sealing surface may be a surface against which the axial seal can be pressed (in compression) to keep the air to be filtered from bypassing the filter medium. It is understood that the complementary sealing surface may itself be compressible; in particular, it may be a surface of an axial seal similar to the aforementioned axial seal.

According to an aspect of the present disclosure, there is provided an air filter comprising at least a first air filter element and a second air filter element as described above, whereby one of said first engagement means and said second engagement means of the first air filter element is engaged with the other one of said first engagement means and said second engagement means of the second air filter element.

The technical effects and advantages of the air filter according to embodiments of the present disclosure correspond mutatis mutandis to those of the corresponding embodiments of the air filter element according to the present disclosure.

BRIEF DESCRIPTION OF THE DRAWINGS

These and other technical features and advantages of embodiments of the present disclosure will now be described in more detail with reference to the accompanying figures, in which.

Throughout the figures, like elements have been designated with like reference numerals.

DETAILED DESCRIPTION OF EMBODIMENTS

Figure 1:
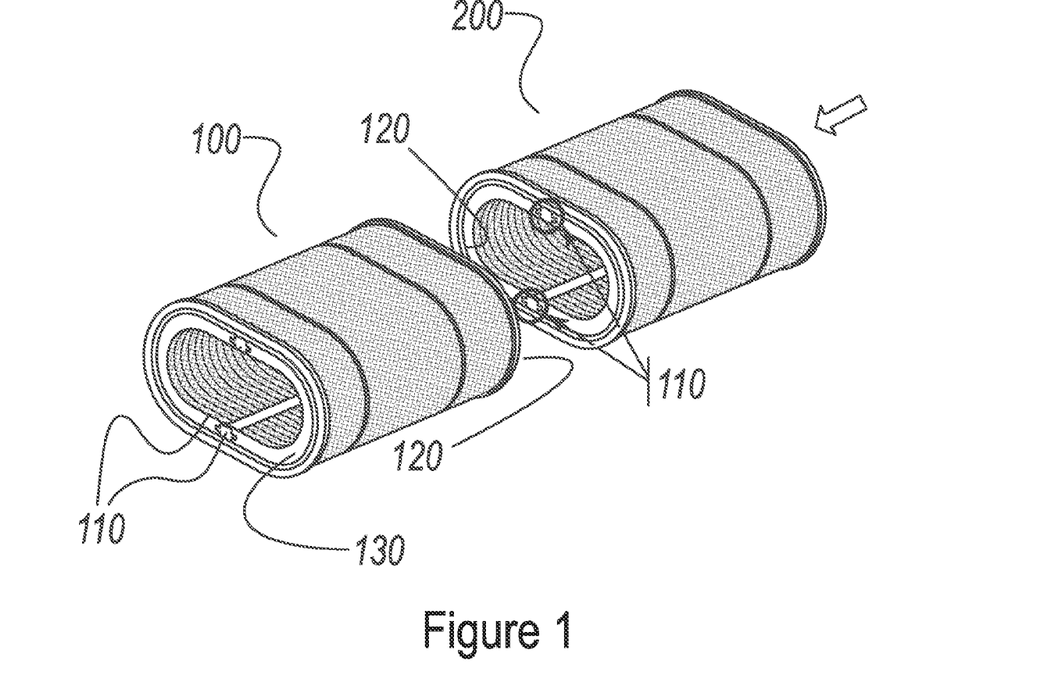
FIG. 1 illustrates an air filter element according to an embodiment of the present disclosure, and a like air filter element axially aligned with said air filter element.

FIG. 1 illustrates an air filter element 100 according to an embodiment of the present disclosure, and a like air filter element 200 axially aligned with said air filter element.

An air filter element 100 according to the present disclosure comprises a tubular main body having a first axial end surface and a second axial end surface. The term "tubular" is not meant to restrict the shape of the main body to shapes with a circular cross section; without limitation, the cross section of the tubular main body may for example be circular, elliptic, or rectangular. The mantle of the tubular main body may comprise any known filtration medium, such as (but not limited to) a pleated medium, a fluted medium, or a permeable non-woven fabric, whereby air to be filtered passes through the filter medium in a substantially radial inside-to-outside or outside-to-inside direction. The term "end surface" is not meant to imply a closed surface. In fact, the "end surface" may be substantially open, providing a conduit for the entry or exit of air, and optionally being defined only by a narrow flange along the edge of the tubular mantle.

The first end surface comprises a first engagement means 110 and the second end surface comprises a second engagement means 120.

The first engagement means 110 and the second engagement means 120 are configured to enter into releasable engagement such that the first engagement means 110 releasably engages with a second engagement means of a like air filter element 200 in axial alignment with the air filter element 100 and/or the second engagement means 120 releasably engages with a first engagement means of a like air filter element 200 in axial alignment with the air filter element 100. To keep the drawing clear and concise, only two air filter elements 100, 200 have been illustrated, but the skilled person will appreciate that the presently disclosed air filter element also allows a larger number of air filter elements to be releasably engaged to each other back-to-back.

Optionally, the first engagement means 110 and the second engagement means 120 are structurally identical, such as mixed-type hook-and-loop fasteners or fasteners of the "dual lock" type. This is particularly useful if the filter element is built in a symmetric manner, whereby the identical nature of the engagement means on both sides will help the operator avoid errors and save time when assembling a filter from multiple filter elements, as no time must be spent selecting a particular orientation of the elements.

Preferably, the first engagement means 110 and/or the second engagement means 120 comprise a support carrying a fabric such as a hook-and-loop fastener or a fastener of the "dual lock" type. The fabric may be attached to the support by means of an adhesive substance or glue, by means of two-sided adhesive tape, or the like. The support is affixed to the respective axial end of the air filter element. The support may be a plate, for example a plate of sheet metal or plastic film. The inventors have found that a stainless steel plate of a thickness in the range of 0.3 mm-0.5 mm is suitable as a support. Preferably, the support is convexly shaped. However, it should be sufficiently flexible to be somewhat flattened during the engagement process. The flattening preferably occurs by elastic deformation of the support, such that the support acts as a spring that returns to its original curved shape during the disengagement process. The degree of curvature of a convexly shaped support, expressed as the height of the curved support above a flat surface on which it rests, may for example be in the range of 0.25 mm to 2 mm, preferably in the range of 0.5 mm to 1.5 mm, and more preferably in the range of 0.5 mm to 1 mm.

Alternatively, one or both of the axial end surfaces may carry the fabric directly, in which case said axial end surface or surfaces may be convexly curved.

Preferably, the support is movably affixed to the respective axial end surface, allowing it to be moved over a small distance along the plane of the axial end surface that carries it. In this manner, the fabrics can be aligned during the engagement process so as to optimally position the hooks/loops, mushroom-shaped protrusions, or other engagement elements provided on the fabric relative to the elements provided on their counterpart, to promote their mutual engagement. The movable engagement may for example be obtained by affixing the support to the axial end surface by means of bolts, screws, rivets, or the like that pass through holes in the support, whereby the holes are intentionally larger than the diameter of the corresponding bolts, screws, rivets, or the like. The holes may thus take the form of slits (allowing movement substantially along one direction), circles (allowing the same extent of movement in all directions in two dimensions), ovals (allowing more movement in one direction than in another), rectangles, and the like; the skilled person can select an appropriate shape for the holes in function of the desired characteristics of the allowed movement. The amount of play allowed by the holes thus determines the amount of movement available to the support. In the case of a curved support, a first amount of play may be foreseen to allow the support to flatten out during the engagement process, whereby a second amount of play is foreseen to allow mutual alignment once the support is flattened out.

The amount of movement made available to the support is preferably chosen in function of the patterns of the engagement elements, so as to allow the amount of relative movement that would be necessary to move from the worst possible alignment of the respective fabrics to the most desired alignment of the respective fabrics. In some embodiments, the engagement elements are mushroom-shaped protrusions arranged in a square grid pattern, and the amount of relative movement made available to the supports of two like air filter elements is equal to or in the order of one half of the distance between two mushrooms in said grid. The skilled person will be able to easily determine suitable distances for other patterns and/or other types of engagement elements. It should be noted that the desired amount of relative movement may be obtained by making the engagement means on just one side or on both sides of the air filter elements movable.

According to the present disclosure, the releasable engagement is able to withstand an axial pulling force up to a first level. The first level is preferably chosen to be above the level of relative axial pull forces experienced by the air filter elements during normal extraction of the air filter from its housing. More specifically, an operator aiming to remove the air filter from its housing for servicing or replacement will typically pull on the element closest to the servicing opening (hereinafter referred to as the "proximal air filter element"), which will pull any additional elements that are connected to it by the engagement means (hereinafter referred to as the "distal air filter element(s)") along with it. While being pulled out, the distal air filter elements may experience drag forces due to their contact with the walls of the housing, leading to a net relative axial force between the air filter elements in the direction of disengagement. As these forces are determined by the design of the filter elements and the housing, they can be anticipated, and the strength of the releasable engagement can be engineered to overcome these pulling forces.

Further according to the present disclosure, the releasable engagement is released when subjected to a pulling force above a second level. The second level is preferably chosen to be above the first level but still sufficiently moderate to allow manual disassembly of the air filter element by axially pulling the mutually engaged air filter elements away from each other.

Preferably, the releasable engagement can be released non-destructively. If the engagement means are designed to release non-destructively in normal circumstances, the air filter elements could subsequently be recombined by reengaging the same engaging means. The number of times the air filter elements can be recombined and released without damaging the engagement means, depends on the type of engagement means chosen, as some materials and mechanisms are more prone to wear than others. Preferably, the air filter elements can be recombined at least once. More preferably, the air filter elements can be recombined at least 10 times.

The release may require the operator to pull the proximal air filter element with one hand while pushing (or holding still) the distal air filter element with the other hand.

One of the first and second axial end surfaces may comprise an axial seal 130, whereby and the other one of the first and second axial end surfaces comprises a complementary sealing surface. The seal 130 and the surface are arranged in such a way that inner cavities of the air filter element 100 and a like air filter element 200 in axial alignment with the air filter element 100 can be sealingly joined to form a single cavity. When so joined, by engaging the respective engagement means of the air filter element 100 and a like air filter element 200, an air filter 300 as shown in FIG. 2 may be obtained.

In embodiments of the air filter element according to the present disclosure, at least one of the first engagement means and the second engagement means comprises a fabric presenting a plurality of axially extending hooks and at least the other one of the first engagement means and the second engagement means comprises a fabric presenting a plurality of axially extending loops, the hooks and the loops being arranged to releasably engage with each other.

Figure 2:
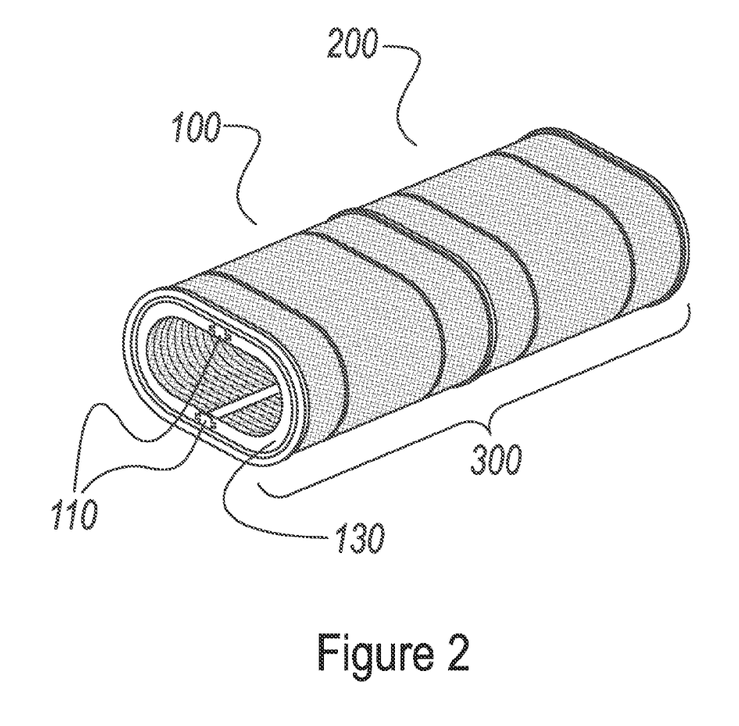
FIG. 2 illustrates an air filter according to an embodiment of the present disclosure, comprising the air filter element and the like air filter element illustrated in FIG. 1.

In the specific embodiment illustrated in FIGS. 1 and 2, the first engagement means 110 and the second engagement means 120 each comprises a pair of patches of fabric. In one embodiment, the pair of patches of fabric of the first engagement means 110 presents a plurality of axially extending hooks and the pair of patches of the second engagement means 120 presents a plurality of axially extending loops, the hooks and the loops being arranged to releasably engage with each other as is common for hook-and-loop fasteners (such as "Velcro" fasteners).

Figure 6:
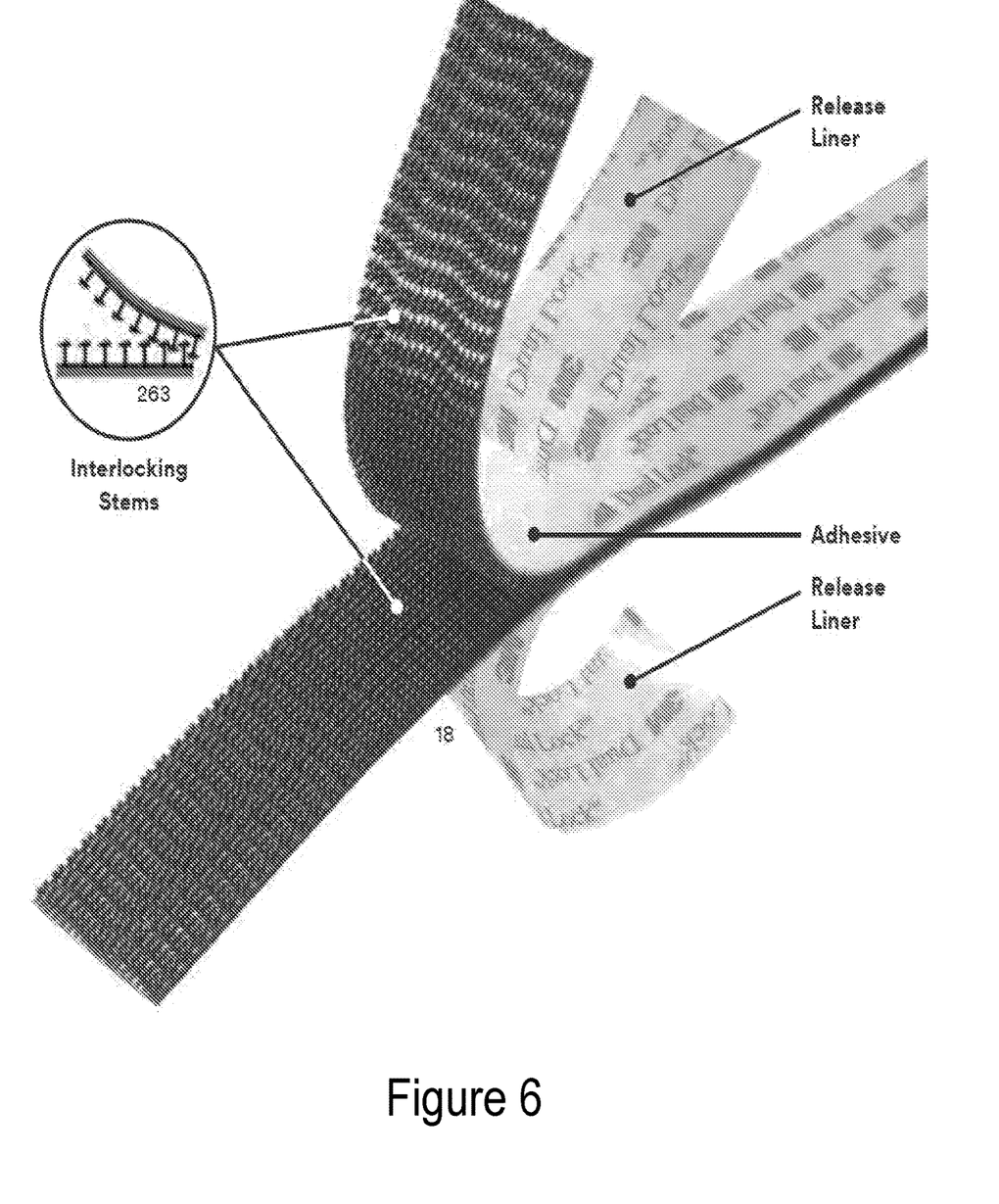
FIG. 6 illustrates a particular type of fabric as may be used in the engagement means in embodiments of the present disclosure.

In a more preferred embodiment, the first engagement means 110 and the second engagement means 120 each comprises one or more patches of fabric capable of releasably engaging with fabric of the same type. A fabric suitable for this application is the "dual lock" range 53550 of 3M (Maplewood, Minnesota, USA). FIG. 6 presents a detailed view of such a fabric, in which the mushroom-shaped protrusions (stems) are arranged in wave-shaped lines to facilitate disengagement.

The inventors have found that a pair of 6.5 cm$^2$ "dual lock" fabric patches of type SJ355B arranged on respective stainless steel support plates can provide an engagement that withstands a pull force of up to approximately 150 N, around which point they tend to disengage non-destructively. This value meets the requirement of being able to withstand the drag forces that the filter elements would experience when being pulled out of their housing, while still being sufficiently low to allow manual disassembly of the engaged filter elements. If patches that provide stronger engagement are used, the disengagement may occur through destructive detachment of the patches from the supports, depending on the type of adhesive used between the patches and the supports.

Figure 3:
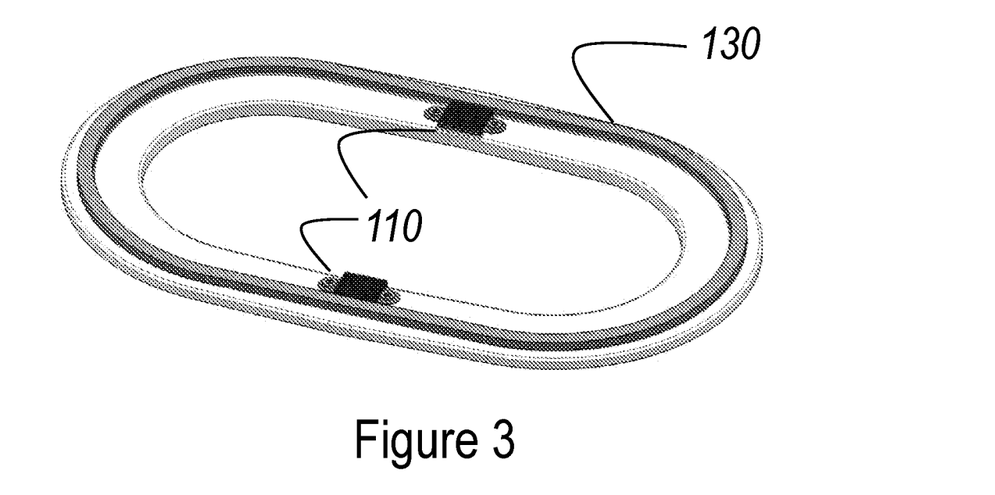
FIG. 3 illustrates a first axial end surface of an air filter element according to an embodiment of the present disclosure.

FIG. 3 illustrates a first axial end surface of such an air filter element, in which the first engagement means 110 and the axial seal 130 can be seen. It will be understood that multiple patches or zones of fabric presenting hooks or loops, or interlocking mushroom-shaped protrusions (stems), or combinations thereof may be provided on either one of the axial end surfaces, as long as the chosen patterns are such that compatible types of fabric meet each other when multiple air filter elements are axially aligned for engagement.

Figure 4:
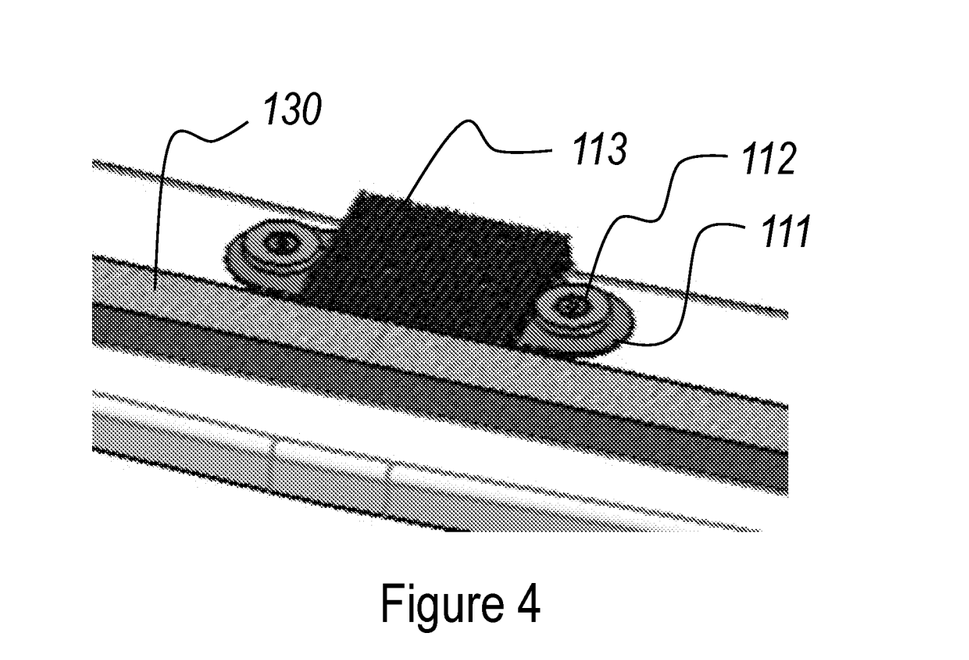
FIG. 4 illustrates a support affixed to an axial end surface of an air filter element according to an embodiment of the present disclosure.

FIG. 4 shows a detail of the first engagement means 110 of FIG. 3. This engagement means 110 includes a support 111, implemented here, by way of example, of a slightly convexly curved metal plate, which carries a patch of fabric 113 configured to engage with a complementary or like patch of fabric of another engagement means. The support 111 is affixed to the axial end surface of the air filter element by means of rivets 112 that pass through holes in the support 111, allowing sufficient play for a slight movement of the support 111 to take place during the engagement process, in particular to align the engagement means with its counterpart and to accommodate a certain flattening of the support. The axial seal 130 is also shown.

Figure 5:
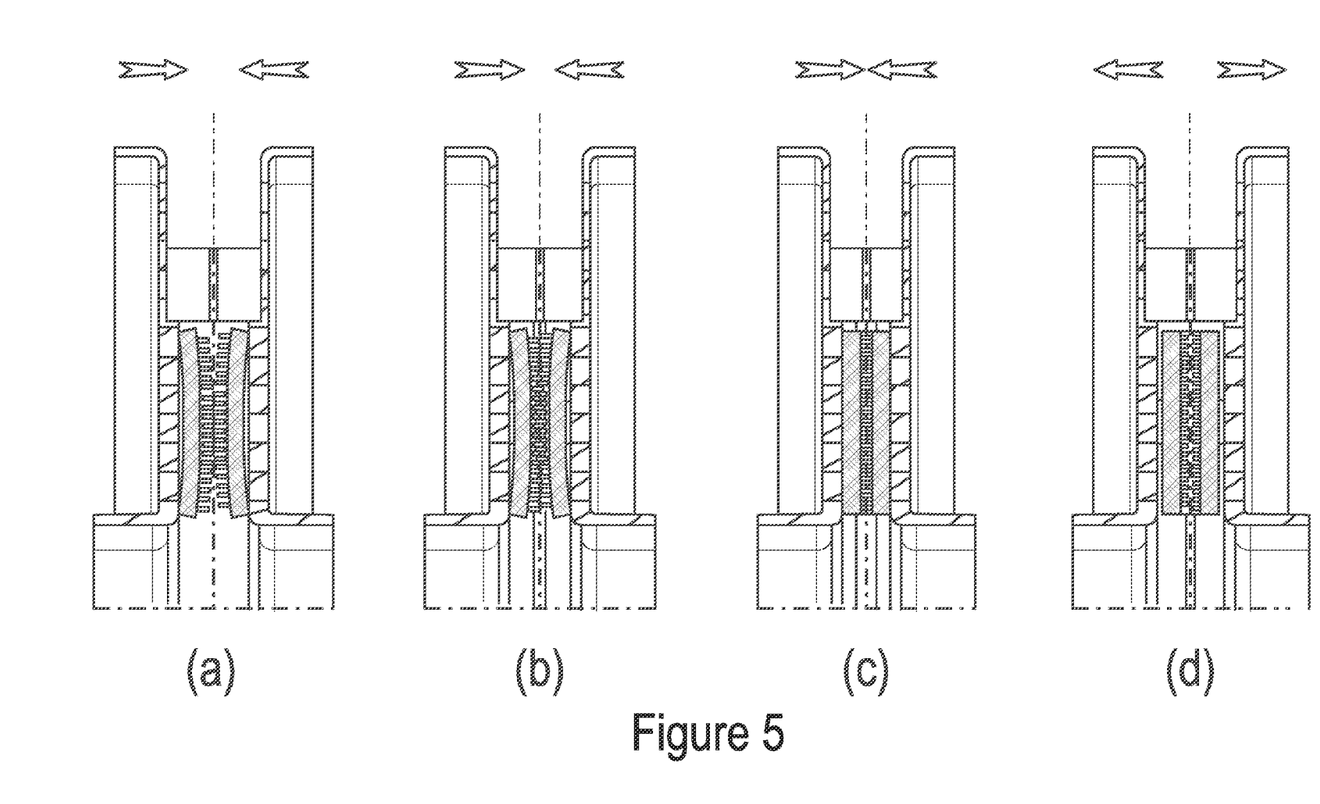
FIG. 5 illustrates a pair of engagement means as may be used in embodiments of the present disclosure, in various stages of engagement.

FIG. 5 illustrates a pair of engagement means of the "dual lock" type in various stages of engagement. In stage (a), the engagement means have been in sufficiently close proximity to allow some of the mushroom-shaped protrusions (stems) of each of the patches of fabric to reach each other, thanks to the convex curvature of the supports on which the patches of fabric are arranged. In stage (b), the engagement means have been pushed close enough together for the sealing surfaces to contact each other. The closer proximity of the engagement means now leads to a greater area of engagement. As the engaged zone extends to the more peripheral parts of the patches of fabric, the strength of this engagement begins to overcome the elastic force that resists the flattening of the initially curved support plates. In stage (c), the engagement process has been completed, whereby the two patches of fabric mutually engage over their entire surface area, and the support plate is substantially flattened. At this point, the elastic force of the compressed seals will counteract the engagement to some extent; however, the engagement force of the engagement means is able to keep the seal suitably compressed. Stage (d) is an illustration of the engaged system's ability to withstand a pull force: in this case, the patches of fabric remain engaged over their entire surface even when a substantial pull force is applied, until the disengagement threshold is reached.

Figure 7:
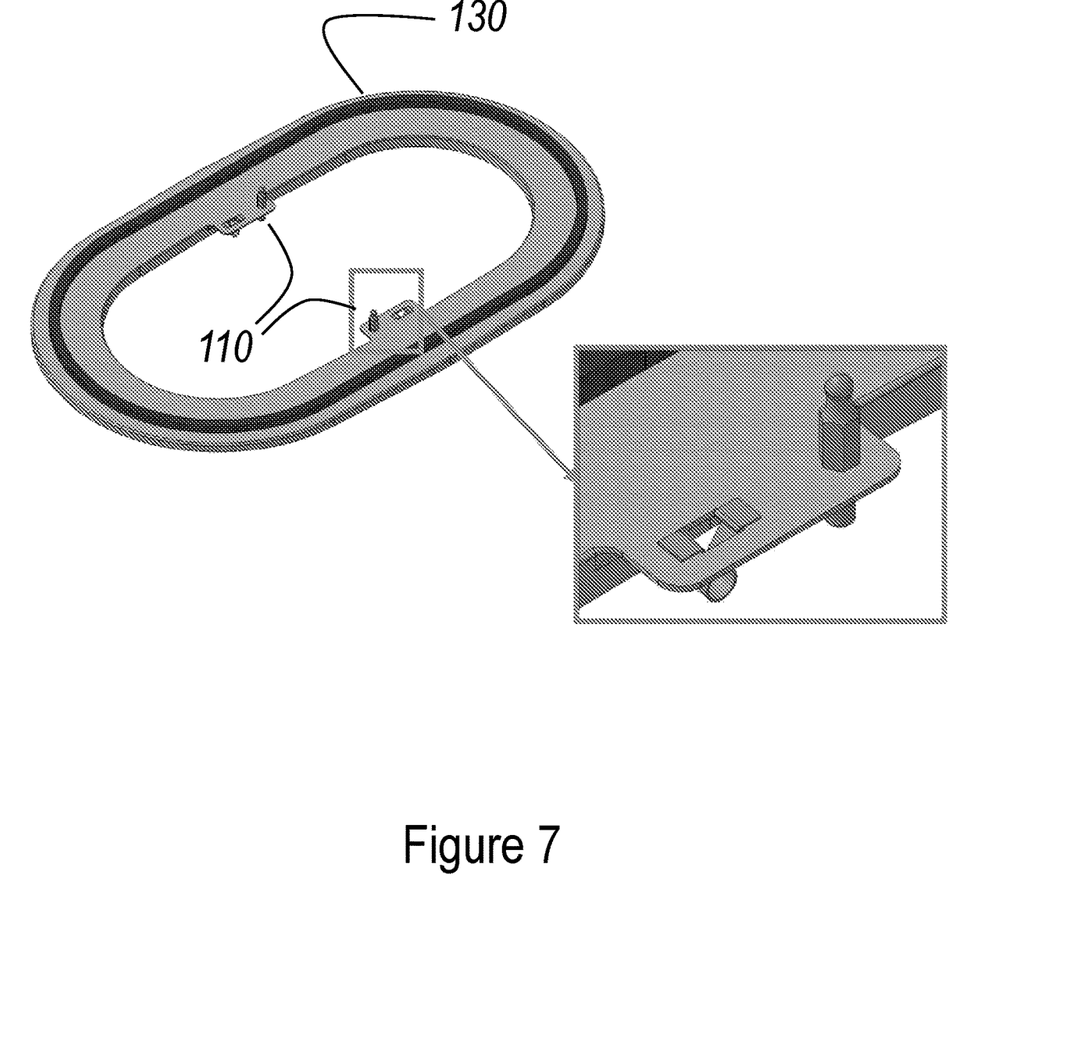
FIG. 7 illustrates a first axial end surface of an air filter element according to another embodiment of the present disclosure.

FIG. 7 illustrates a first axial end surface of an air filter element according to another embodiment of the present disclosure.

In other embodiments of the air filter element according to the present disclosure, at least one of the first engagement means and the second engagement means comprises a number of axial protrusions, each having a bulging portion at its axial end, and wherein at least the other one of the first engagement means and the second engagement means comprises the same number of receptors, arranged to elastically clamp the bulging portions of the axial protrusions of a like air filter element in axial alignment with the air filter element.

In the specific embodiment illustrated in FIG. 7, the first engagement means 110 comprises a pair of protrusions and the second engagement means 120 comprises a pair of corresponding receptors. In addition, the first engagement means 110 also includes a pair of receptors arranged to engage with corresponding protrusions on the second engagement means 120. In this way, different air filter elements axially engage in a mutual, symmetric way. It will be understood that different numbers of protrusions or receptors or combinations thereof may be provided on either one of the axial end surfaces, as long as the chosen patterns are such that complementary types of fasteners meet each other when multiple air filter elements are axially aligned for engagement.

In still other embodiments of the air filter element according to the present disclosure, the first engagement means 110 comprises a magnet having a first polarity, and the second engagement means 120 comprises a second polarity, different from the first polarity.

The present disclosure also pertains to an air filter 300 comprising at least a first air filter element 100 and a second air filter element 200 as described above, whereby one of the first engagement means 110 and the second engagement means 120 of the first air filter element 100 is engaged with the other one of the first engagement means and the second engagement means of the second air filter element 200.

The present disclosure also more generally pertains to an air filter element comprising a tubular main body having a first axial end surface and a second axial end surface; wherein at least one of said first end surface and said second end surface comprises an engagement means. Said at least one of said first end surface and said second end surface further comprises an axial seal. This type of filter element is not necessarily configured for back-to-back interconnection with a like filter element. It is an advantage of this type filter element that it can releasably engage with a complementary engagement means provided on a housing or other part of an air conduction system, e.g. on the system head where an air flow is to be exchanged with the interior of the tubular main body. The axial seal is preferably arranged circumferentially around an axial opening of the tubular main body, whereby the engagement means, when engaged, ensures that a sufficient compression of said axial seal is maintained during use of the air filter, thus avoiding air leaks or bypass effects. In this configuration, the engagement means preferably comprises a fabric presenting a plurality of axially extending hooks or axially extending loops (e.g., "Velcro" type engagement means) or a fabric designed to releasably engage with a like fabric (e.g., "dual lock" type fasteners).

While the invention has been described hereinabove with reference to specific embodiments, this was done to illustrate and not to limit the invention, the scope of which is determined by the accompanying claims.

The invention claimed is:

1. An air filter element comprising a tubular main body having a first axial end surface and a second axial end surface;
   wherein said first axial end surface comprises a first engagement element and said second axial end surface comprises a second engagement element;
   said first engagement element being configured to enter into releasable engagement such that said first engagement element releasably engages with an external engagement element in axial alignment with said air filter element, whereby said releasable engagement between said first engagement element of said air filter element and said external engagement element is able to withstand the axial pulling force up to a first level, and whereby said releasable engagement is released when subjected to the pulling force above a second level;
   said second engagement element being configured to enter into releasable engagement such that said second engagement element releasably engages with another external engagement element in axial alignment with said air filter element, whereby said releasable engagement between said second engagement element of said air filter element and said another external engagement element is able to withstand an axial pulling force up to said first level, and whereby said releasable engagement between said second engagement element of said air filter element and said another external engagement element is released when subjected to a pulling force above said second level,
   wherein said first engagement element and said second engagement element of the air filter element comprise a fabric designed to releasably engage with another fabric.

2. The air filter element according to claim 1, wherein at least one of said first engagement element and said second engagement element of said air filter element comprises the fabric presenting a plurality of axially extending hooks and wherein at least the other one of said first engagement element and said second engagement element comprises the another fabric presenting a plurality of axially extending loops, said plurality of axially extending hooks being arranged to releasably engage with said plurality of axially extending loops of one of: said external engagement element and said another external engagement element.

3. The air filter element according to claim 1, wherein at least one of said fabric and said another fabric is arranged on a convexly curved support.

4. The air filter element according to claim 1, wherein at least one of said fabric and said another fabric is arranged on a support, and wherein said support is movably affixed to the respective axial end surface of either of said first axial end surface or said second axial end surface of said air filter element.

5. The air filter element according to claim 1, wherein each of said fabric and said another fabric carry further engagement elements arranged in wave-shaped rows.

6. The air filter element according to claim 1, wherein at least one of said first engagement element and said second engagement element of said air filter element comprises a number of axial protrusions, each axial protrusion of said number of axial protrusions having a bulging portion at its axial end, and wherein at least the other one of said first engagement element and said second engagement element of said air filter element comprises a number of receptors equal to the number of bulging portions, the number of receptors arranged to elastically clamp the number of bulging portions of the axial protrusions of one of: said external engagement element and said another external engagement element in axial alignment with said air filter element.

7. The air filter element according to claim 1, wherein said first engagement element of said air filter element comprises a magnet having a first polarity, and wherein said second engagement element of said air filter element comprises a second polarity, and wherein the second polarity is different from said first polarity.

8. The air filter element according to claim 1, wherein one of said first and second axial end surfaces of said air filter element comprises an axial seal and the other one of said first and second axial end surfaces of said air filter element comprises a complementary sealing surface, said axial seals are arranged in such a way that inner cavities of said air filter element and another air filter element in axial alignment with said air filter element can be sealingly joined to form a single cavity.

9. An air filter element comprising a tubular main body having a first axial end surface and a second axial end surface, wherein the first axial end surface comprises a first fastener and the second axial end surface comprises a second fastener, wherein each of the first fastener and the second fastener are configured to releasably engage such that the first fastener of the air filter element is configured to releasably engage with a second fastener of another air filter element in axial alignment with the air filter element, and the second fastener of the air filter element is configured to releasably engage with a first fastener of yet another air filter element in axial alignment with the air filter element, and wherein the first fastener of the air filter element is configured to remain engaged with the second fastener of the another air filter element at an axial pulling force up to a first level, and wherein the first fastener of the air filter element is configured to release the second fastener of the another air filter element when the axial pulling force meets or exceeds a second level, and wherein the axial pulling force of the second level is greater than the axial pulling force of the first level, wherein the first fastener and the second fastener comprise a fabric configured to releasably engage with another fabric.

10. The air filter element according to claim 9, wherein the axial pulling force of the first level is greater than an axial pulling force required to extract the air filter element from a housing.

11. The air filter element according to claim 9, wherein at least one of the first fastener and the second fastener of the air filter element comprises the fabric presenting a plurality of axially extending hooks; and wherein at least the other one of the first fastener and the second fastener of the air filter element comprises the another fabric presenting a plurality of axially extending loops;

wherein the plurality of axially extending hooks and the plurality of axially extending loops are configured to releasably engage with each other.

12. The air filter element according to claim 9, wherein at least one of the fabric and the another fabric is arranged on a convexly curved support.

13. The air filter element according to claim 9, wherein at least one of the fabric and the another fabric is arranged on a support, and wherein the support is movably affixed to the respective axial end surface of either of the first axial end surface or the second axial end surface of the air filter element.

14. The air filter element according to claim 9, wherein each of the fabric and the another fabric carry further engagement elements arranged in wave-shaped rows.

15. The air filter element according to claim 9, wherein at least one of the first fastener and the second fastener of the air filter element comprises a number of axial protrusions, each axial protrusion of the number of axial protrusions having a bulging portion at its axial end, and wherein at least the other one of the first fastener and the second fastener of the air filter element comprises a number of receptors equal to the number of bulging portions, the number of receptors arranged to elastically clamp a number of bulging portions of axial protrusions of another air filter element in axial alignment with the air filter element.

16. The air filter element according to claim 9, wherein one of the first and second axial end surfaces of the air filter element comprises an axial seal, and the other one of the first and second axial end surfaces of the air filter element comprises a complementary sealing surface, wherein an inner cavity of the air filter element and another inner cavity of another air filter element are configured to axially align with the air filter element and are further configured to sealingly join to form a single cavity.

17. The air filter element according to claim 1, wherein said first engagement element and said second engagement element of said air filter element comprise the same type of fabric.

18. The air filter element according to claim 9, wherein the first fastener and the second fastener of the air filter element comprise the same type of fabric.

* * * * *